United States Patent
Sirotkin et al.

(10) Patent No.: US 10,785,699 B2
(45) Date of Patent: Sep. 22, 2020

(54) NEXT GENERATION NODE-B (GNB) FOR INTEGRATED ACCESS AND BACKHAUL (IAB) RELAY IN NEW RADIO (NR) NETWORKS

(71) Applicant: Apple Inc., Cupertino, CA (US)

(72) Inventors: Alexander Sirotkin, Tel-Aviv (IL); Candy Yiu, Portland, OR (US); Qian Li, Beaverton, OR (US); Sudeep K. Palat, Cheltenham (GB); Song Noh, Hillsboro, OR (US); Geng Wu, Portland, OR (US); Lili Wei, Hillsboro, OR (US); Hassan Ghozlan, Hillsboro, OR (US); Dawei Ying, Hillsboro, OR (US); Ozgur Oyman, San Jose, CA (US); Thomas Luetzenkirchen, Taufkirchen (DE); Shankar Sudhir Pola, Bangalore (IN); Usharani Ayyalasomayajula, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/366,739

(22) Filed: Mar. 27, 2019

(65) Prior Publication Data

US 2019/0223078 A1    Jul. 18, 2019

Related U.S. Application Data

(60) Provisional application No. 62/649,295, filed on Mar. 28, 2018, provisional application No. 62/653,967, (Continued)

(51) Int. Cl.
*H04L 12/701*     (2013.01)
*H04W 40/22*     (2009.01)
(Continued)

(52) U.S. Cl.
CPC ............ *H04W 40/22* (2013.01); *H04B 7/155* (2013.01); *H04B 7/2606* (2013.01); *H04L 45/34* (2013.01);
(Continued)

(58) Field of Classification Search
None
See application file for complete search history.

(56) References Cited

U.S. PATENT DOCUMENTS

2015/0131578 A1* 5/2015 Baek ................. H04W 72/0406
370/329

OTHER PUBLICATIONS

"3rd Generation Partnership Project; Technical Specification Group Radio Access Network; NR; Physical layer procedures for control", 3GPP TS 38.213 V15.4.0 Release 15, (Dec. 2018), 104 pgs.
(Continued)

*Primary Examiner* — Ayanah S George
(74) *Attorney, Agent, or Firm* — Kowert, Hood, Munyon, Rankin & Goetzel, P.C.

(57) ABSTRACT

Embodiments of a Next Generation Node-B (gNB) and methods of communication are disclosed herein. The gNB may be configured with a gNB central unit (gNB-CU) and a gNB distributed unit (gNB-DU). The gNB-CU may determine a route for delivery of a data packet to a User Equipment (UE) on an integrated access backhaul (IAB) of relays. The gNB may generate a physical layer (PHY) data packet in accordance with a split between functionality of a packet data convergence protocol (PDCP) layer at the gNB-CU and functionality of a radio link control (RLC) layer at the gNB-DU. The PHY data packet may include the data packet, a PDCP header, an adaptation layer header, an RLC header, a medium access control (MAC) header, and a PHY header. The adaptation layer header may indicate one or more relays included in the route.

21 Claims, 11 Drawing Sheets

Related U.S. Application Data filed on Apr. 6, 2018, provisional application No. 62/670,619, filed on May 11, 2018.

(51) Int. Cl.

| | | |
|---|---|---|
| *H04L 12/721* | (2013.01) | |
| *H04L 29/08* | (2006.01) | |
| *H04B 7/26* | (2006.01) | |
| *H04B 7/155* | (2006.01) | |
| *H04W 92/12* | (2009.01) | |
| *H04W 88/08* | (2009.01) | |
| *H04W 80/02* | (2009.01) | |
| *H04L 12/751* | (2013.01) | |

(52) U.S. Cl.
CPC ............ *H04L 69/324* (2013.01); *H04L 45/02* (2013.01); *H04W 80/02* (2013.01); *H04W 88/085* (2013.01); *H04W 92/12* (2013.01)

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification", 3GPP TS 36.321 V15.4.0 Release 15, (Dec. 2018), 131 pgs.

Islam, Muhammad Nazmul, "Integrated Access Backhaul in Millimeter Wave Networks", 2017 IEEE Wireless Communications and Networking Conference (WCNC), (Mar. 2017), 6 pgs.

Saha, Chiranjib, "Integrated mmWave Access and Backhaul in 5G: Bandwidth Partitioning and Downlink Analysis", Cornell University arXiv:1710.06255, (Oct. 17, 2017), 6 pgs.

\* cited by examiner

US 10,785,699 B2

NEXT GENERATION NODE-B (GNB) FOR INTEGRATED ACCESS AND BACKHAUL (IAB) RELAY IN NEW RADIO (NR) NETWORKS

PRIORITY CLAIM

This application claims priority under 35 USC 119(e) to U.S. Provisional Patent Application Ser. No. 62/649,295, filed Mar. 28, 2018 [reference number AB0015-Z], and to U.S. Provisional Patent Application Ser. No. 62/653,967, filed Apr. 6, 2018 [reference number AB0344-Z], and to U.S. Provisional Patent Application Ser. No. 62/670,619, filed May 11, 2018 [reference number AB0889-Z], all of which are incorporated herein by reference in their entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, New Radio (NR) networks, and 3GPP LTE-A (LTE Advanced) networks, although the scope of the embodiments is not limited in this respect. Some embodiments relate to paging of mobile devices. Some embodiments relate to disaggregated base stations, including disaggregated Next Generation Node-B (gNB) devices. Some embodiments relate to integrated access and backhaul (IAB). Some embodiments relate to relay, including but not limited to IAB relay.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
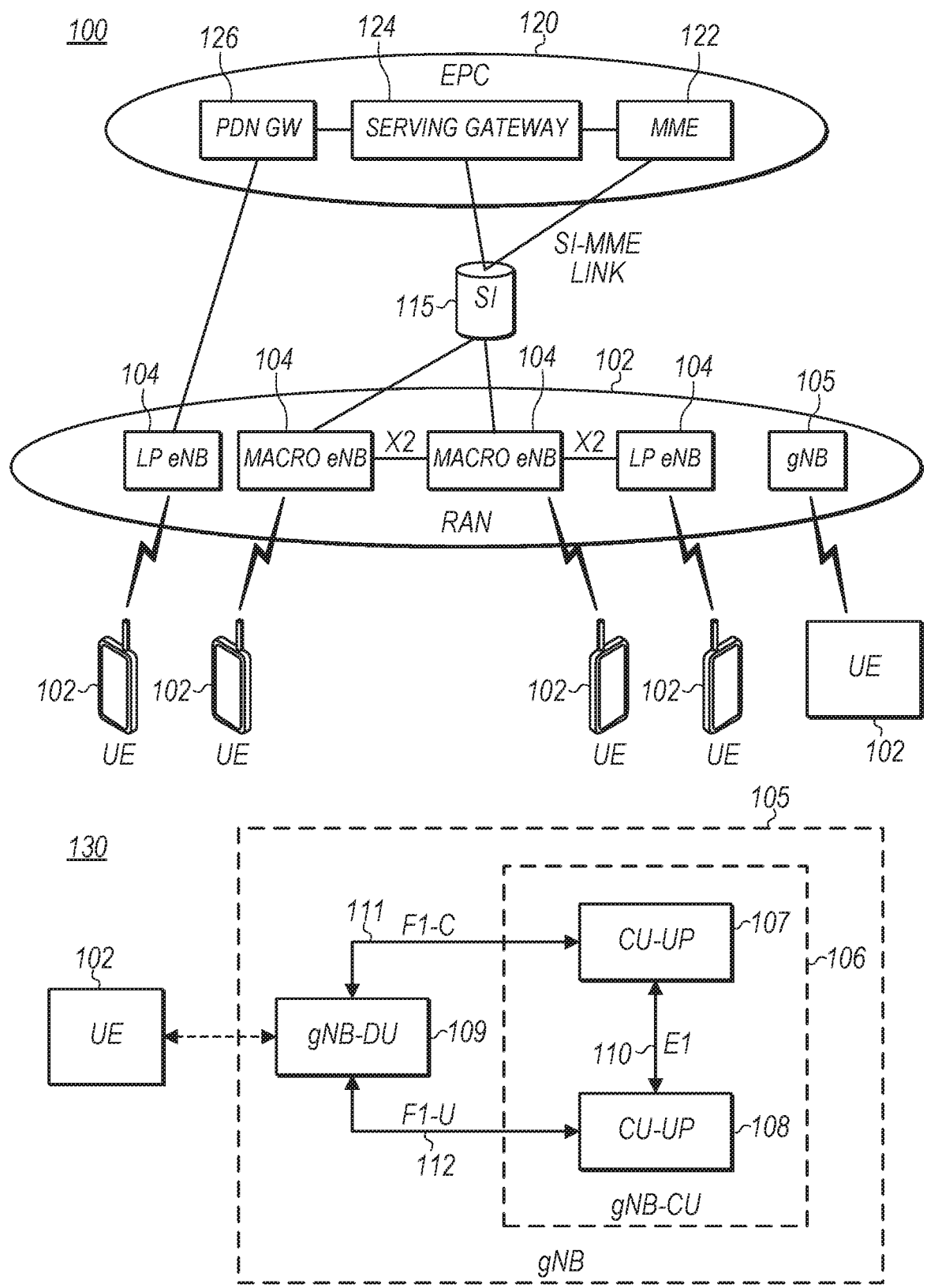
FIG. 1A is a functional diagram of an example network in accordance with some embodiments.
Figure 1B:
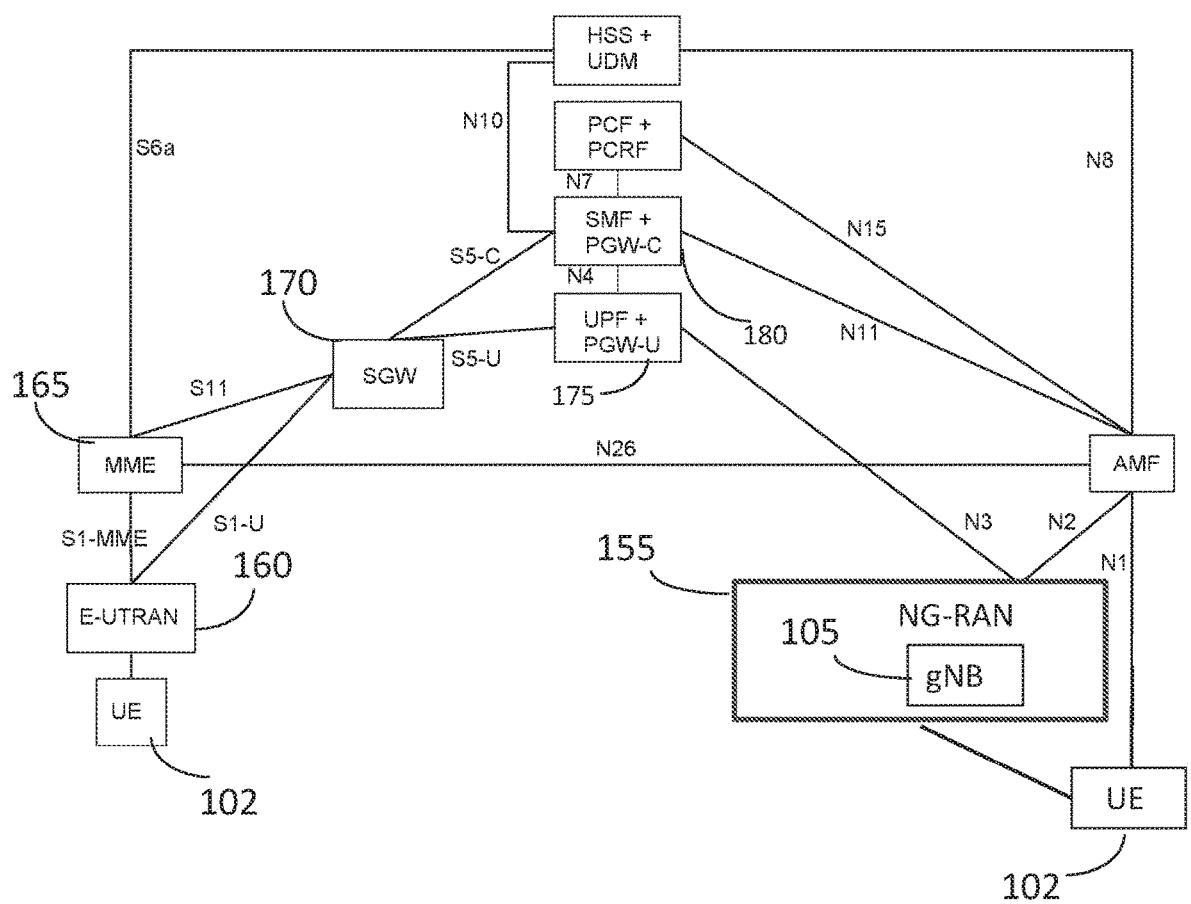
FIG. 1B is a functional diagram of another example network in accordance with some embodiments.
Figure 1C:
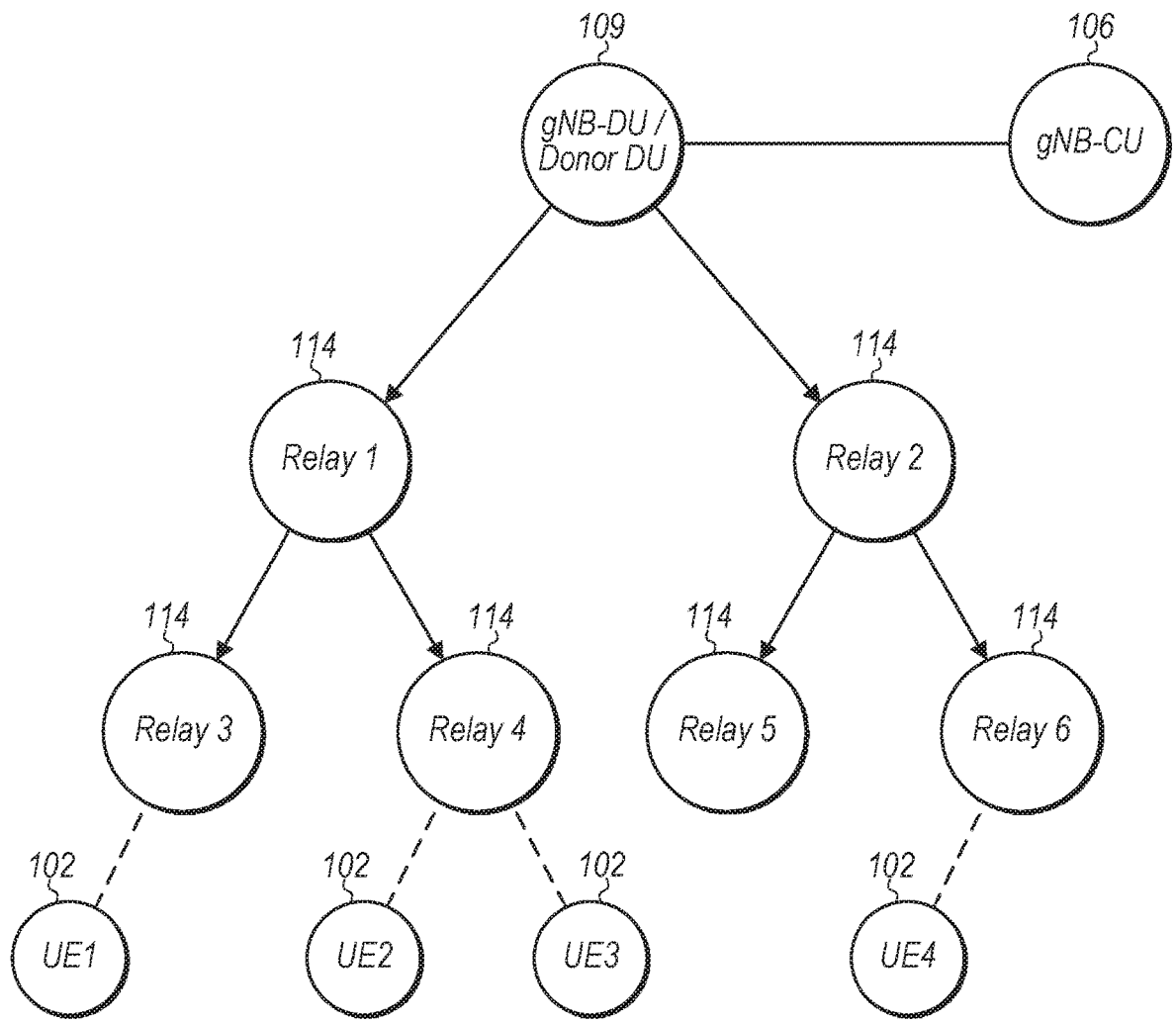
FIG. 1C is a functional diagram of another example network in accordance with some embodiments.

FIG. 1A is a functional diagram of an example network in accordance with some embodiments. FIG. 1B is a functional diagram of another example network in accordance with some embodiments. FIG. 1C is a functional diagram of another example network in accordance with some embodiments. In references herein, "FIG. 1" may include FIG. 1A and FIG. 1B and FIG. 1C. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

In some embodiments, a network may include one or more components shown in FIG. 1C. Some embodiments may not necessarily include all components shown in FIG. 1C, and some embodiments may include additional components not shown in FIG. 1C. In some embodiments, a network may include one or more components shown in FIG. 1A, one or more components shown in FIG. 1B, and/or one or more components shown in FIG. 1C. In some embodiments, a network may include one or more components shown in FIG. 1A, one or more components shown in FIG. 1B, one or more components shown in FIG. 1C, and/or one or more other components.

The network 100 may comprise a radio access network (RAN) 101 and the core network 120. In some embodiments, the core network may be a 5GC network, and one or more components may communicate through an NG interface, although the scope of embodiments is not limited in this respect. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of a 5G network. In another non-limiting example, the RAN 101 may include one or more components of an E-UTRAN and one or more components of another network (including but not limited to an NR network).

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise a gNB central unit (gNB-CU) 106 and a gNB distributed unit (gNB-DU) 109. Embodiments are not limited to the number of components shown, as the gNB 105 may include multiple gNB-CUs 106 and/or multiple gNB-DUs 109, in some embodiments. In some embodiments, the gNB-CU 106 may include a control unit userplane (CU-UP) entity 108 and a control unit control-plane (CU-CP) 107. Embodiments are not limited to the number of components shown, as the gNB-CU 106 may include multiple CU-CPs 107 and/or multiple CU-UPs 108, in some embodiments. In some embodiments, the CU-CP 107 and the CU-UP 108 may communicate over the E1 interface 110, although the scope of embodiments is not limited in this respect. In some embodiments, the gNB-CU 106 and the gNB-DU 109 may communicate over an F1 interface, although the scope of embodiments is not limited in this respect. In some embodiments, the F1 interface may include an F1-C interface 111 and an F1-U interface 112, although the scope of embodiments is not limited in this respect. In some embodiments, the CU-CP 107 and the gNB-DU 109 may communicate over the F1-C interface 111, although the scope of embodiments is not limited in this respect. In some embodiments, the CU-UP 108 and the gNB-DU 109 may communicate over the F1-U interface 112, although the scope of embodiments is not limited in this respect.

In some embodiments, the gNB-CU 106 and the gNB-DU 109 may be part of a disaggregated gNB 105. One or more of the gNB-CU 106, CU-CP 107, CU-UP 108, gNB-DU 109 may be co-located, in some embodiments. One or more of the gNB-CU 106, CU-CP 107, CU-UP 108, gNB-DU 109 may not necessarily be co-located, in some embodiments. Other arrangements are possible, including arrangements in which two or more of the gNB-CU 106, CU-CP 107, CU-UP 108, gNB-DU 109 are co-located.

The scope of embodiments is not limited to arrangements in which the gNB-CU 106 and the gNB-DU 109 are part of a disaggregated gNB 105, however. In some embodiments, one or more of the techniques, operations and/or methods described herein may be practiced by a gNB-CU 106, CU-CP 107, CU-UP 108 and/or gNB-DU 109 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the gNB-CU 106, CU-CP 107, CU-UP 108, gNB-DU 109.

References herein to an operation, technique and/or method performed by the gNB 105 are not limiting. In some embodiments, such an operation, technique and/or method may be performed by one of the gNB-CU 106, CU-CP 107, CU-UP 108, gNB-DU 109.

In some embodiments, one or more of the UEs 102, gNBs 105, gNB-CU 106, CU-CP 107, CU-UP 108, gNB-DU 109, and/or eNBs 104 may be configured to operate in accordance with an NR protocol and/or NR technique. References to a UE 102, eNB 104, gNB 105, gNB-CU 106, CU-CP 107, CU-UP 108 and/or gNB-DU 109 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 109). In some embodiments, the UE 102 may receive signals from a component of a disaggregated gNB 105 (such as the gNB-DU 109).

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104, a gNB 105, a gNB-CU 106, a gNB-DU 109, a relay 114 and/or other component(s) over a multicarrier communication channel in accordance with an Orthogonal Frequency Division Multiple Access (OFDMA) communication technique. In some embodiments, an eNB 104, a gNB 105, a gNB-CU 106, a gNB-DU 109, a relay 114 and/or other component(s) may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104.

The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 175, 180 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In FIG. 1C, the example network 190 may include one or more gNB-CUs 106, one or more gNB-DUs 109, one or more relays 114 and/or other component(s). It should be noted that a relay 114 may be a gNB-DU 109, a transmit-receive point (TRP), a device/component configured to operate as a relay, another device and/or another component, in some embodiments. In some embodiments, the relay 114 may be an integrated access and backhaul (IAB) relay, although the scope of embodiments is not limited in this respect.

In addition, in FIGS. 1C and 1n some descriptions herein, the gNB-DU 109 may be referred to as a "donor DU," although such references are not limiting. For instance, the gNB-DU 109 labeled as "donor DU" may be a first gNB-DU 109, and one of the relays 114 may be a second gNB-DU 109. The label of "donor DU" may clarify that the first gNB-DU 109 receives a packet directly from the gNB-CU 106 for forwarding to the one or more relays 114 (such as the second gNB-DU 109 and/or other component(s)).

It should be noted that the components shown in FIG. 1C may not necessarily comprise an entire network. One or more of the components shown in FIG. 1C may be included in another network (including but not limited to one of the networks shown in FIG. 1A and/or FIG. 1B). The networks shown in FIG. 1A and FIG. 1B may be extended to include one or more relays 114, in some embodiments. Embodiments are not limited to the number or type of components shown in FIG. 1C. Embodiments are also not limited to the connectivity of components shown in FIG. 1C.

In some embodiments, the gNB 105 may communicate with one or more relays 114. In some embodiments, the gNB-DU 109 may communicate with one or more relays 114. In some embodiments, the gNB-CU 106 may communicate with one or more relays 114. In some embodiments, one or more of the relays 114 may communicate with the UE 102. In some embodiments, some or all of the relays 114 may communicate with one or more other relays 114. Non-limiting examples related to FIG. 1C are described elsewhere herein.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. In some embodiments, a downlink resource grid may be used for downlink transmissions from a relay 114 to a UE 102, while uplink transmission from the UE 102 to the relay 114 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
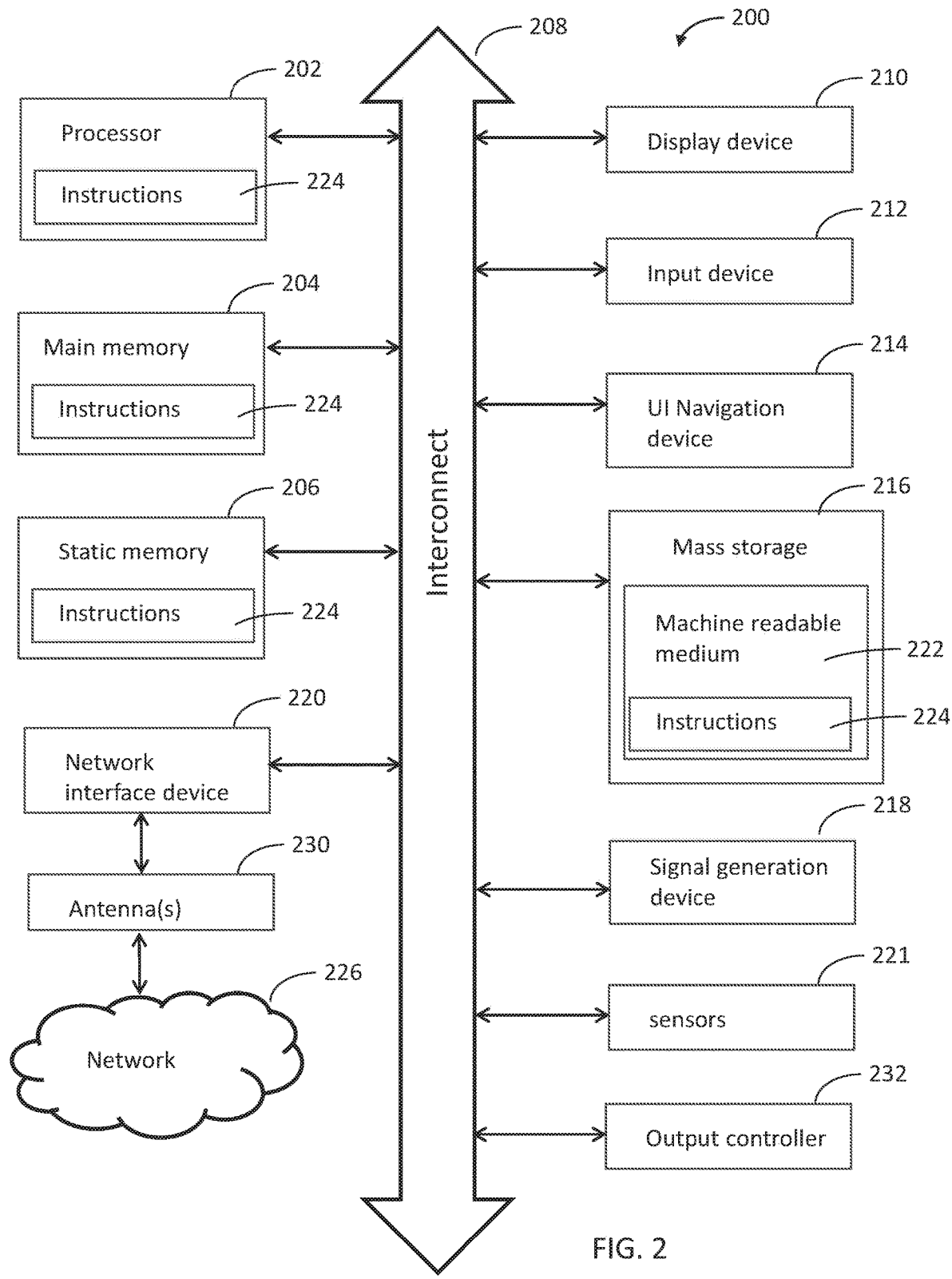
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, CU-CP 107, CU-UP 108, gNB-DU 109, relay 114, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
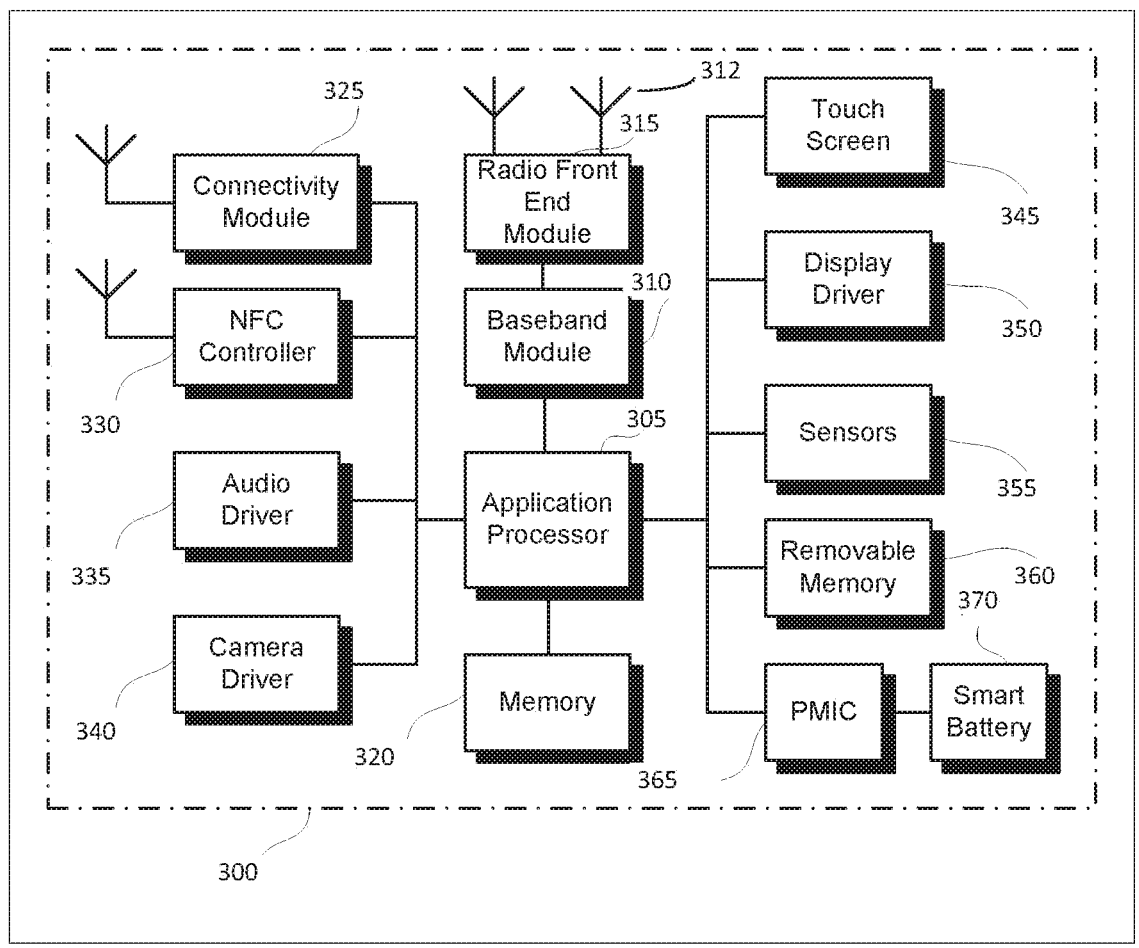
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. The user device 300 may be suitable for use as a relay 114 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
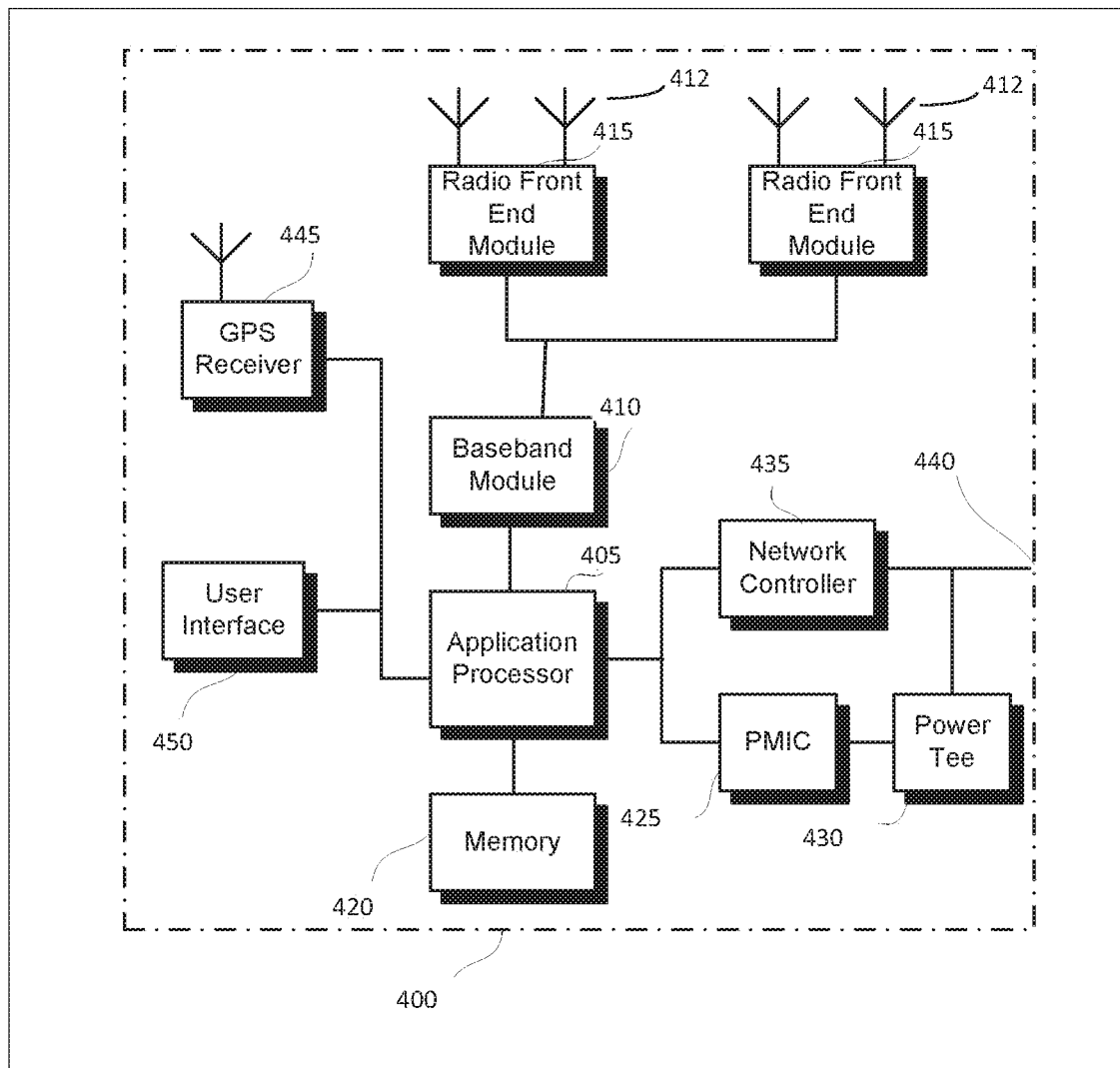
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a CU-CP 107, an apparatus of a CU-CP 107, a CU-CU 108, an apparatus of a CU-CU 108, a gNB-DU 109 an apparatus of a gNB-DU 109, a relay 114, an apparatus of a relay 114, a base station and/or an apparatus of a base station may include one or more of the components shown in one or more of FIGS. 2, 4, and 5. In some embodiments, such an eNB 104, gNB 105, gNB-CU 106, CU-CP 107, CU-UP 108, gNB-DU 109, relay 114, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
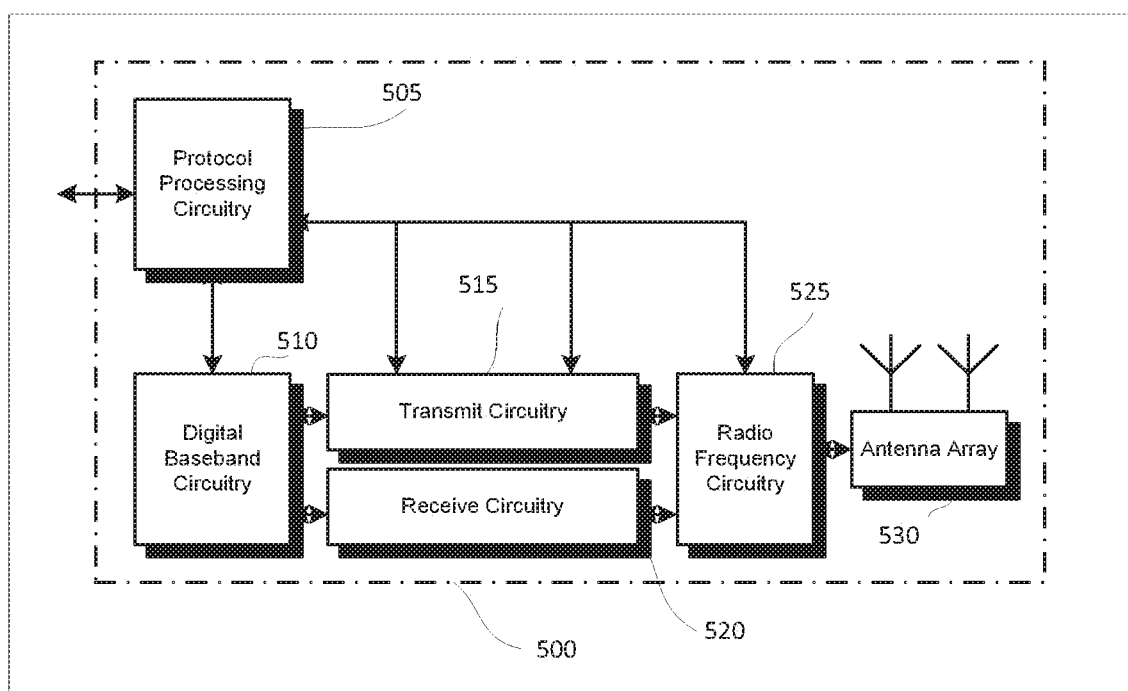
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, CU-CP 107, CU-UP 108, gNB-DU 109, relay 114, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, CU-CP 107, CU-UP 108, gNB-DU 109, relay 114, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, CU-CP 107, CU-UP 108, gNB-DU 109, relay 114, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, CU-CP 107, CU-UP 108, gNB-DU 109, relay 114, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, CU-CP 107, CU-UP 108, gNB-DU 109, relay 114, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, CU-CP 107, CU-UP 108, gNB-DU 109, relay 114, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, CU-CP 107, CU-UP 108, gNB-DU 109, relay 114, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, CU-CP 107, CU-UP 108, gNB-DU 109, relay 114, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the gNB-CU 106, may be applicable to an apparatus of a gNB-CU. In addition, techniques and operations described herein that refer to the CU-CP 107 may be applicable to an apparatus of a CU-CP. In addition, techniques and operations described herein that refer to the CU-UP 108 may be applicable to an apparatus of a CU-UP. In addition, techniques and operations described herein that refer to the gNB-DU 109 may be applicable to an apparatus of a gNB-DU. In addition, techniques and operations described herein that refer to the relay 114 may be applicable to an apparatus of a relay 114.

It should be noted that some of the descriptions herein may refer to performance of operations, methods and/or techniques by elements such as the gNB 105, gNB-CU 106, CU-CP 107, CU-UP 108, gNB-DU 109 and/or relay 114. Such references are not limiting, however. One or more of the operations, methods and/or techniques may be performed by one or more other entities, in some embodiments.

In accordance with some embodiments, a gNB 105 may be configured with logical nodes, including a gNB-CU 106 and a gNB-DU 109. The gNB-CU 106 may determine a route for delivery of a data packet from the gNB-DU 109 to a UE 102 on an integrated access backhaul (IAB) of relays 114. The route may include one or more of the relays 114 of the IAB. The gNB 105 may generate a physical layer (PHY) data packet for the delivery of the data packet. The PHY data packet may be generated in accordance with a split between functionality of a packet data convergence protocol (PDCP) layer at the gNB-CU 106 and functionality of a radio link control (RLC) layer at the gNB-DU 109. To generate the PHY data packet in accordance with the split, the gNB-CU 106 may: generate a PDCP header and an adaptation layer header, wherein the adaptation layer header indicates the one or more relays 114 included in the route; and transfer the data packet, the PDCP header, and the adaptation layer header to the gNB-DU 109. To generate the PHY data packet in accordance with the split, the gNB-CU 109 may: generate an RLC header, a medium access control (MAC) header, and a PHY header; and generate the PHY data packet to include the data packet, the PDCP header, the adaptation layer header, the RLC header, the MAC header, and the PHY header. The gNB-DU 109 may forward the PHY data packet to a first relay 114 of the one or more relays 114 included in the route. These embodiments are described in more detail below.

Figure 6:
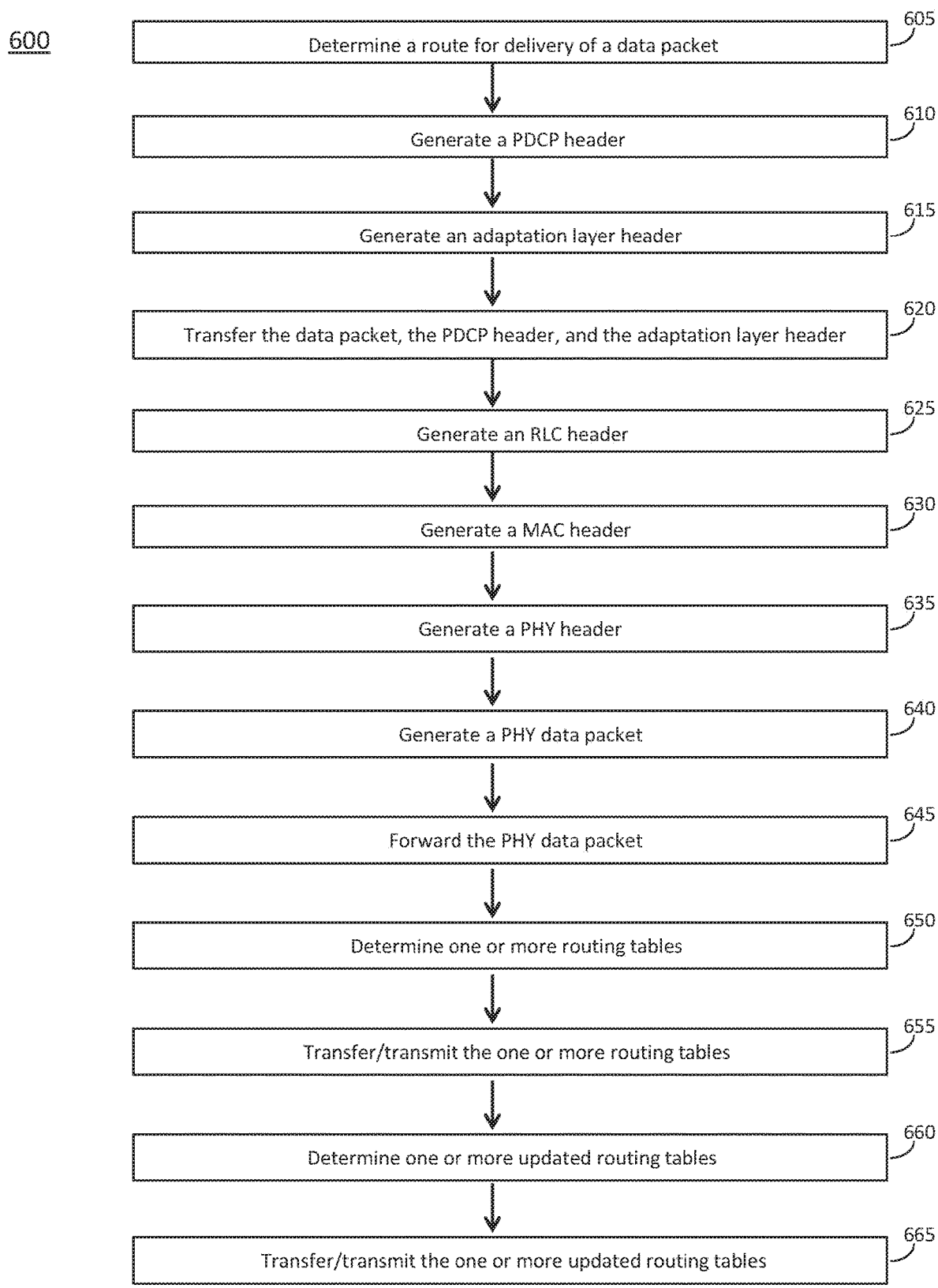
FIG. 6 illustrates the operation of a method of communication in accordance with some embodiments.
Figure 7:
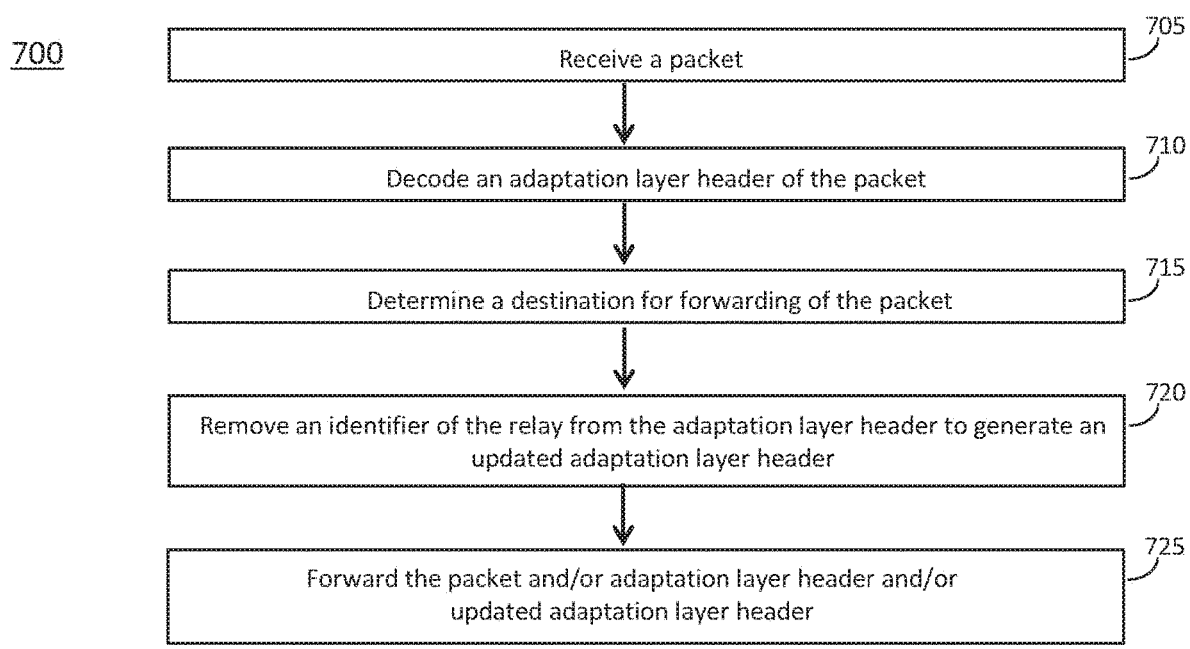
FIG. 7 illustrates the operation of another method of communication in accordance with some embodiments.

FIG. 6 illustrates the operation of a method of communication in accordance with some embodiments. FIG. 7 illustrates the operation of another method of communication in accordance with some embodiments. It is important to note that embodiments of the methods 600, 700 may include additional or even fewer operations or processes in comparison to what is illustrated in FIGS. 6-7. In addition, embodiments of the methods 600, 700 are not necessarily limited to the chronological order that is shown in FIGS. 6-7. In describing the methods 600 and/or 700, references may be made to one or more figures, although it is understood that the methods 600, 700 may be practiced with any other suitable systems, interfaces and components.

The methods 600, 700 and other methods described herein may refer to eNBs 104, gNBs 105, components of the gNB (such as 106-109), relays 114 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11.

The methods 600 and/or 700 may also be applicable to an apparatus of a gNB 105, an apparatus of an eNB 104, an apparatus of a gNB-CU 106, an apparatus of a CU-CP 107, an apparatus of a CU-UP 108, an apparatus of a gNB-DU 109, an apparatus of a relay 114 and/or an apparatus of another device described above.

It should also be noted that embodiments are not limited by references herein (such as in descriptions of the methods 600, 700 and/or other descriptions herein) to transfer, transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transfer and/or transmission. The transfer and/or transmission may be performed by an interface, a transceiver and/or other component, in some cases. In some embodiments, such an element may be decoded, detected or otherwise processed by the processing circuitry (such as by the baseband processor). The element may be received by an interface, transceiver and/or other component, in some cases. In some embodiments, the processing circuitry and the interface may be included in a same apparatus. The scope of embodiments is not limited in this respect, however, as the interface may be separate from the apparatus that comprises the processing circuitry, in some embodiments. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those elements and is also not limited to usage of elements that are included in standards, however. For instance, although an operation may include usage of a message in descriptions herein, it is understood that the same operation and/or similar operation may use a different message, in some embodiments.

In some embodiments, a gNB 105 may perform one or more operations of the method 600, but embodiments are not limited to performance of the method 600 and/or operations of it by the gNB 105. In some embodiments, one or more components of the gNB 105 (including but not limited to the gNB-CU 106, CU-CP 107, CU-UP 108 and/or gNB-DU 109) may perform one or more operations of the method 600. For instance, the gNB-CU 106 may perform one or more operations and the gNB-DU 109 may perform one or more operations, in some embodiments. Embodiments are not limited to performance of the method 600 by a disaggregated gNB 105 and/or components of a disaggregated gNB 105. In some embodiments, a gNB 105 that is not necessarily a disaggregated gNB 105, may perform one or more operations of the method 600.

In some embodiments, a relay 114 may perform one or more operations of the method 700, but embodiments are not limited to performance of the method 700 and/or operations of it by the relay 114. In some embodiments, one or more components of the gNB 105 (including but not limited to the gNB-CU 106, CU-CP 107, CU-UP 108 and/or gNB-DU 109) may perform one or more operations of the method 700. In some embodiments, one or more components of the gNB 105 (including but not limited to the gNB-CU 106, CU-CP 107, CU-UP 108 and/or gNB-DU 109) may perform one or more operations that are similar to one or more operations of the method 700. In some embodiments, one or more components of the gNB 105 (including but not limited to the gNB-CU 106, CU-CP 107, CU-UP 108 and/or gNB-DU 109) may perform one or more operations that are reciprocal to one or more operations of the method 700.

In some embodiments, the relay 114 may perform one or more operations that may be the same as one or more operations of the method 600 or the same as one or more operations described herein. In some embodiments, the relay 114 may perform one or more operations that may be similar to one or more operations of the method 600 or similar to one or more operations described herein. In some embodiments, the relay 114 may perform one or more operations that may be reciprocal to one or more operations of the method 600 or reciprocal to one or more operations described herein. For instance, an operation of the method 600 may include transmission/transfer of a packet by the gNB-DU 109 and an operation of the method 700 may include reception of the same packet and/or similar packet by the relay 114.

In some embodiments, the gNB 105, the gNB-CU 106, the gNB-DU 109, one or more of the relays 114 and/or the UEs 102 may be arranged to operate in accordance with one or more of: a new radio (NR) protocol, a 3GPP protocol, a 3GPP LTE protocol and/or other protocol(s).

In some embodiments, the gNB 105 may be configured with one or more logical nodes, including a gNB-CU 106 and a gNB-DU 109. In some embodiments, the gNB 105 may be configured with one or more logical nodes, including one or more gNB-CUs 106 and/or one or more gNB-DUs 109.

At operation 605, the gNB-CU 106 and/or gNB 105 may determine a route for delivery of a data packet. In some embodiments, the gNB-CU 106 and/or gNB 105 may determine a route for delivery of a data packet from the gNB-DU 109 to a UE 102. In some embodiments, the gNB-CU 106 and/or gNB 105 may determine a route for delivery of a data packet from the gNB-DU 109 to a UE 102 on an integrated access backhaul (IAB) of relays 114. The route may include one or more of the relays 114 of the IAB.

In some embodiments, the data packet may be received from a user plane function (UPF) entity, although the scope of embodiments is not limited in this respect. In some embodiments, the data packet may be received from the UPF entity on a next generation (NG) interface, although the scope of embodiments is not limited in this respect. In a non-limiting example, the data packet may be an internet protocol (IP) packet. Any suitable type of data packet may be used, in some embodiments.

At operation 610, the gNB-CU 106 and/or gNB 105 may generate a packet data convergence protocol (PDCP) header. In some embodiments, the gNB-CU 106 may generate the PDCP header based on the data packet. In some embodiments, the gNB-CU 106 may, as part of the functionality of the PDCP layer, perform one or more of: ciphering for the data packet, integrity protection for the data packet, and one or more other operations.

At operation 615, the gNB-CU 106 and/or gNB 105 may generate an adaptation layer header. In some embodiments, the adaptation layer header may indicate the one or more relays 114 included in the route. In some embodiments, the adaptation layer header may include information related to the one or more relays 114 included in the route. In some embodiments, the gNB-CU 106 and/or gNB 105 may encode the adaptation layer header to include a sequence of relay identifiers of the one or more relays 114 included in the route. The sequence of relay identifiers may indicate an order in which the PHY data packet is to be routed by the one or more relays 114 included in the route.

In some embodiments, the gNB-CU 106 may generate the adaptation layer header for an adaptation layer between a PDCP layer and a RLC layer.

At operation 620, the gNB-CU 106 and/or gNB 105 may transfer the data packet, the PDCP header, and the adaptation layer header. In some embodiments, the gNB-CU 106 and/or gNB 105 may transfer the data packet, the PDCP header, and the adaptation layer header to the gNB-DU 109. In some embodiments, the gNB 105 and/or gNB-CU 106 and/or gNB-DU 109 (and/or apparatus of one or more of those components) may include an F1 interface or may be coupled to an F1 interface. The data packet, the PDCP header, and the adaptation layer header may be transferred from the gNB-CU 106 to the gNB-DU 109 on the F1 interface.

At operation 625, the gNB-DU 109 and/or gNB 105 may generate a radio link control (RLC) header. At operation 630, the gNB-DU 109 and/or gNB 105 may generate a medium access control (MAC) header. At operation 635, the gNB-DU 109 and/or gNB 105 may generate a physical layer (PHY) header.

In some embodiments, the gNB-DU 109 may generate the RLC header based on the data packet, the PDCP header, and the adaptation layer header. In some embodiments, the gNB-DU 109 may generate the RLC header based on one or more of: the data packet, the PDCP header, the adaptation layer header, and one or more other elements.

In some embodiments, the gNB-DU 109 may, as part of the functionality of the RLC layer, perform one or more of: fragmentation of the data packet, concatenation of the data packet with one or more other data packets, and one or more other operations.

At operation 640, the gNB 105 and/or gNB-CU 106 and/or gNB-DU 109 may generate a PHY data packet. In some embodiments, the gNB 105 and/or the gNB-CU 106 and/or the gNB-DU 109 may generate the PHY data packet for the delivery of the data packet. In some embodiments, the gNB 105 and/or the gNB-CU 106 and/or the gNB-DU 109 may generate the PHY data packet to enable the delivery of the data packet.

In some embodiments, the gNB 105 and/or the gNB-CU 106 and/or the gNB-DU 109 may generate the PHY data packet to include one or more of: the data packet, the PDCP header, the adaptation layer header, the RLC header, the MAC header, and the PHY header. In some embodiments, all of the above headers/elements may not necessarily be included in the PHY data packet. In some embodiments, one or more other elements may be included in the PHY data packet.

In some embodiments, the gNB 105 and/or the gNB-CU 106 and/or the gNB-DU 109 may generate the PHY data packet in accordance with a split between functionality of a PDCP layer at the gNB-CU 106 and functionality of an RLC layer at the gNB-DU 109. In some embodiments, the gNB 105 and/or the gNB-CU 106 and/or the gNB-DU 109 may perform one or more of operations 610-640 and/or other operation(s) as part of the generation of the PHY data packet. In some embodiments, the gNB 105 and/or the gNB-CU 106 and/or the gNB-DU 109 may perform one or more of operations 610-640 and/or other operation(s) as part of the generation of the PHY data packet in accordance with the split.

At operation 645, the gNB-DU 109 and/or gNB 105 may forward the PHY data packet. In some embodiments, the gNB-DU 109 and/or gNB 105 may forward the PHY data packet to one of the relays 114. In some embodiments, the gNB-DU 109 and/or gNB 105 may forward the PHY data packet to a UE 102.

In some embodiments, the gNB-DU 109 and/or gNB 105 may forward the PHY data packet to a first relay 114 of the one or more relays 114 included in the route. In a non-limiting example, the adaptation layer may include a sequence of one or more relays 114 that indicates an order in which the PHY data packet is to be routed. The gNB-DU 109 and/or gNB 105 may forward the PHY data packet to the first relay 114 of that sequence.

In some embodiments, the gNB-DU 109 and/or gNB 105 may forward the PHY data packet to the first relay 114 of the one or more relays for forwarding to another component. The component may be another relay 114 or may be the UE 102, depending on how many relays 114 are included in the route. For instance, the gNB-DU 109 and/or gNB 105 may forward the PHY data packet to the first relay for forwarding to a second relay 114 of the one or more relays if the route includes two or more relays. And the gNB-DU 109 and/or gNB 105 may forward the PHY data packet to the first relay 114 of the one or more relays included in the route for forwarding to the UE 102 if the route includes less than two relays 114.

In some embodiments, the gNB 105 and/or gNB-CU 106 and/or gNB-DU 109 may determine a route for delivery of a data packet from the gNB 105 to a UE 102 on an IAB of relays 114. The route may include one or more of the relays 114 of the IAB. The gNB 105 and/or gNB-CU 106 and/or gNB-DU 109 may generate a PDCP header, an adaptation layer header, an RLC header, a MAC header and a PHY header. The adaptation layer header may include a sequence of relay identifiers of the one or more relays 114 included in the route. In some embodiments, the sequence of relay identifiers may indicate an order in which the PHY data packet is to be routed by the one or more relays 114 included in the route. In some embodiments, the gNB 105 and/or gNB-CU 106 and/or gNB-DU 109 may forward, to a first relay 114 of the one or more relays 114 included in the route, a PHY data packet that includes the PDCP header, the adaptation layer header, the RLC header, the MAC header, and the PHY header. In some embodiments, the PHY data packet may be generated in accordance with a functional split between the gNB-CU 106 and the gNB-DU 109, wherein: at least one of the PDCP header, the adaptation layer header, the RLC header, the MAC header, and the PHY header is generated at the gNB-CU 106; and at least one of the PDCP header, the adaptation layer header, the RLC header, the MAC header, and the PHY header is generated at the gNB-DU 109.

It should be noted that the term "PHY data packet" is used for clarity, but embodiments are not limited by this term. Accordingly, at operation 640, the gNB-DU 109 and/or gNB 105 may generate a packet (not necessarily a PHY data packet) that includes one or more of: the data packet, the PDCP header, the adaptation layer header, the RLC header, the MAC header, and the PHY header. The gNB-DU 109 and/or gNB 105 may forward that packet at operation 645.

At operation 650, the gNB-CU 106 and/or gNB 105 may determine one or more routing tables. At operation 655, the gNB-CU 106 and/or gNB-DU 109 and/or gNB 105 may transmit/transfer the one or more routing tables. At operation 660, the gNB-CU 106 and/or gNB 105 may determine one or more updated routing tables. At operation 665, the gNB-CU 106 and/or gNB-DU 109 and/or gNB 105 may transmit/transfer the one or more updated routing tables.

In some embodiments, the gNB-CU 106 may determine routing tables for an integrated access backhaul (IAB) of relays 114 for delivery of data packets from the gNB 105 to one or more UEs 102 attached to the IAB. In some embodiments, a routing table may be determined for each of the relays 114 of the IAB. In some embodiments, each of the routing tables may indicate pairs of sources and destinations to be used for routing of data packets. Each of the sources may be one of the relays 114 of the IAB or the gNB-DU 109. Each of the destinations may be one of the relays 114 of the IAB or one of the UEs 102.

In some embodiments, the gNB-CU 106 may transfer the routing tables to the gNB-DU 109 for forwarding to the relays 114 of the IAB.

In some embodiments, the gNB-CU 106 may determine updated routing tables in response to a topology change of one of the relays of the IAB. The gNB-CU 106 may transfer the updated routing tables to the gNB-DU 1109 for forwarding to the relays 114 of the IAB.

In some embodiments, the topology change(s) may be related to one or more of: an attachment of another relay 114 to one of the relays 114 of the IAB; an attachment of another relay 114 to the gNB-DU 109; a release of one of the relays 114 of the IAB from another relay 114 of the IAB; a release of one of the relays 114 of the IAB from the gNB-DU 109; an attachment of another UE 102 to one of the relays 11 of the IAB; an attachment of another UE 102 to the gNB-DU 109; a release of one of the UEs 102 attached to the IAB from one of the relays 114 of the IAB; a release of one of the UEs 102 attached to the IAB from the gNB-DU 109; a handover of one of the UEs 102 attached to the IAB from a first relay 114 of the IAB to a second relay 114 of the IAB; and/or other.

In some embodiments, the gNB-CU 106 may transfer the updated routing tables to the gNB-DU 109 over an F1 interface for forwarding to the relays 114 of the IAB.

In some embodiments, the gNB 105 and/or the gNB-CU 106 and/or gNB-DU 109 may, for each of the relays 114 of the IAB: encode, for transmission by the gNB-DU 109 or by another relay 114 of the IAB, a radio resource control (RRC) message that indicates a corresponding updated routing table.

In some embodiments, the gNB 105 may be arranged to communicate with a Third Generation Partnership Project Long Term Evolution (3GPP LTE) network and with a New Radio (NR) network in accordance with an Evolved Universal Terrestrial Radio Access New Radio Dual Connectivity (EN-DC) arrangement. The gNB-CU 106 may, on an Xn interface, forward the updated routing tables to a component of the 3GPP LTE network for forwarding to the relays 114 of the IAB.

In some embodiments, the gNB 105 and/or gNB-CU 106 and/or gNB-DU 109 may generate a physical layer (PHY) data packet based on a data packet intended for one of the UEs 102 attached to the IAB. The PHY data packet may be generated in accordance with a split between functionality of a PDCP layer at the gNB-CU 106 and functionality of an RLC layer at the gNB-DU 109. To generate the PHY data packet in accordance with the split: the gNB-CU 106 may generate a PDCP header; the gNB-DU 109 may generate an RLC header, a medium access control (MAC) header, and a PHY header; and the gNB-DU 109 may generate the PHY data packet to include the data packet, the PDCP header, the RLC header, the MAC header, and the PHY header.

It should be noted that some embodiments may not necessarily include all operations shown in FIG. 6. In a non-limiting example, some embodiments may be based on usage of an adaptation layer header, and may not necessarily include one or more of operations 650-665. In another non-limiting example, some embodiments based on usage of routing tables may include one or more of operations 650-665, and may not necessarily include operation 615 (generation of the adaptation layer header).

In some embodiments, an apparatus of a gNB 105 and/or a component of the gNB 105 may comprise memory. The memory may be configurable to store information related to the one or more relays 114 included in the route. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to determination of the route. The apparatus may include a transceiver to transmit the PHY data packet. The transceiver may transmit and/or receive other blocks, messages and/or other elements.

At operation 705, the relay 114 may receive a packet. In some embodiments, the relay 114 may be included in an IAB. In some embodiments, the relay 114 may receive the packet from the gNB-DU 109 or from another relay 114 of the IAB. In some embodiments, the packet may be a PHY data packet described herein, although the scope of embodiments is not limited in this respect. In some embodiments, the packet may include an adaptation layer header.

At operation 710, the relay 114 may decode an adaptation layer header of the packet. In some embodiments, the adaptation layer header may be the same as or similar to the adaptation layer header described regarding the method 600, although the scope of embodiments is not limited in this respect. In some embodiments, the adaptation layer header may indicate a route for the packet between the gNB 105 and the UE 102. The route may include the relay 114 and may be configurable to include one or more other relays 114.

At operation 715, the relay 114 may determine a destination for forwarding of the packet. In some embodiments, the relay 114 may determine the destination based on the adaptation layer header, although the scope of embodiments is not limited in this respect. In some embodiments, the destination may be another relay 114 of the IAB or the UE 102.

At operation 720, the relay 114 may remove an identifier of the relay from the adaptation layer header to generate an updated adaptation layer header. At operation 725, the relay 114 may forward the packet and/or adaptation layer header and/or updated adaptation layer header. In some embodiments, the relay 114 may forward the packet and/or adaptation layer header and/or updated adaptation layer header to the destination determined at operation 715.

In some embodiments, in a first configuration, if the destination is another relay 114 of the IAB, the relay 114 may: remove an identifier of the relay 114 from the adaptation layer header to generate an updated adaptation layer header; and forward the packet with the updated adaptation layer header to the destination. In some embodiments, in a second configuration, if the destination is another relay 114 of the IAB, the relay 114 may forward the packet with the adaptation layer header to the destination. For instance, the relay 114 may not necessarily modify and/or update the adaptation layer header as may be done in the first configuration. In some embodiments, in the first and second configurations, if the destination is the UE 102, the relay 114 may forward the packet without the adaptation layer header to the destination.

Figure 8:
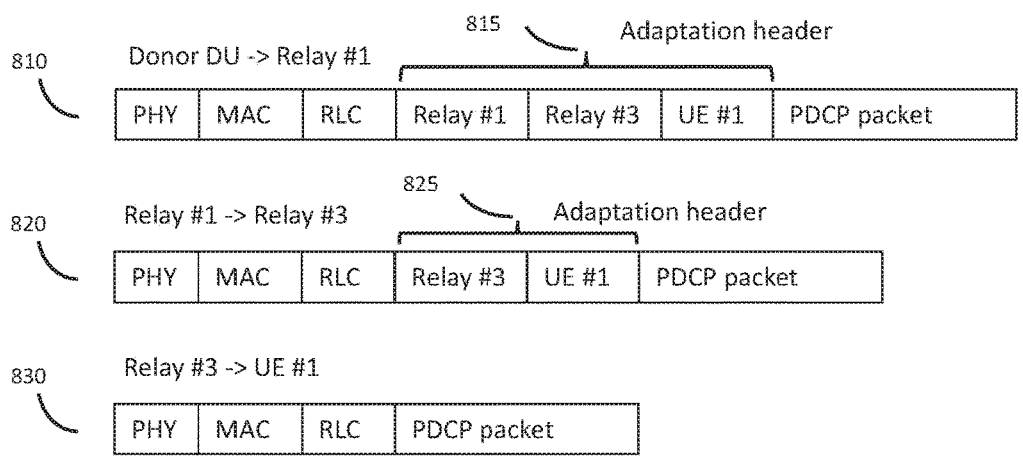
FIG. 8 illustrates example packets in accordance with some embodiments.
Figure 8:
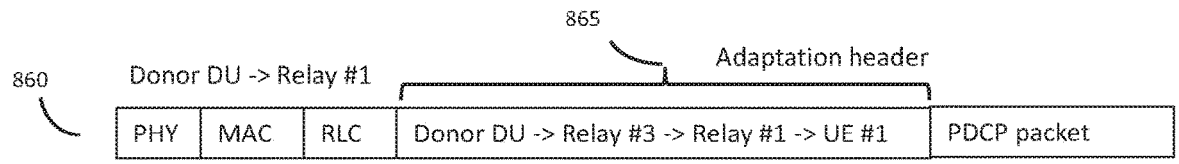
Figure 9:
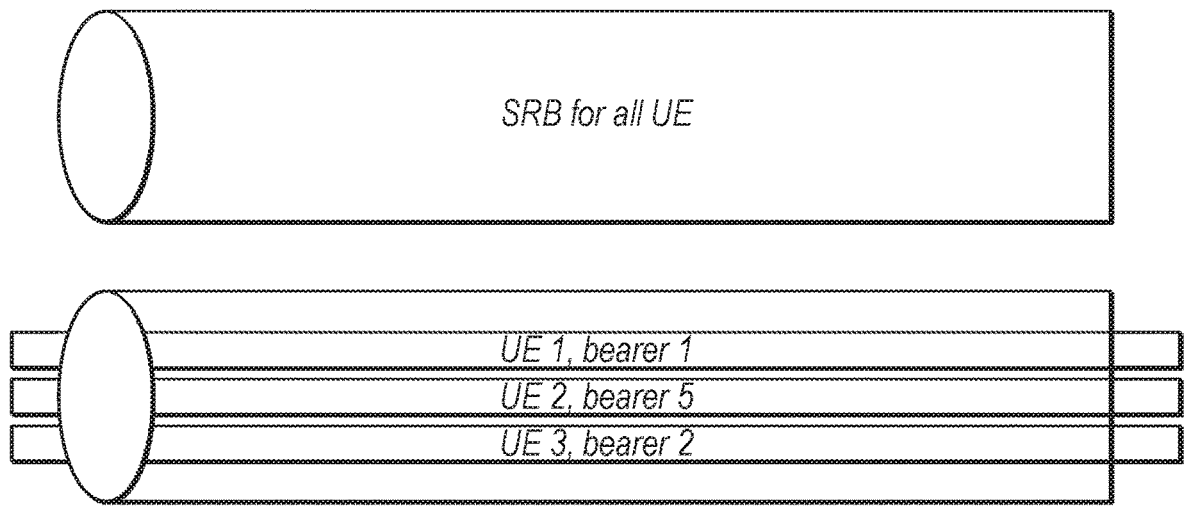
FIG. 9 illustrates an example of an integrated access backhaul (IAB) relay node bearer mapping in accordance with some embodiments.

FIG. 8 illustrates example packets in accordance with some embodiments. FIG. 9 illustrates an example of an integrated access backhaul (IAB) relay node bearer mapping in accordance with some embodiments. It should be noted that the examples shown in FIGS. 8-9 may illustrate some or all of the concepts and techniques described herein in some cases, but embodiments are not limited by the examples. For instance, embodiments are not limited by the name, number, type, size, ordering, arrangement of elements (such as devices, operations, messages, packets, bearers and/or other elements) shown in FIGS. 8-9. Although some of the elements shown in the examples of FIGS. 8-9 may be included in a 3GPP LTE standard, 5G standard, NR standard and/or other standard, embodiments are not limited to usage of such elements that are included in standards.

Some embodiments may be related to integrated access and backhaul (IAB) for NR, including but not limited to the following. Some embodiments may be related to topology management for single-hop/multi-hop and redundant connectivity [RAN2, RAN3], including but not limited to: protocol stack and network architecture design (including interfaces between TRPs) considering operation of multiple relay hops between the anchor node (e.g. connection to core) and UE 102; Control and User plane procedures, including handling of QoS, for supporting forwarding of traffic across one or multiple wireless backhaul links; and/or other. Some embodiments may be related to route selection and optimization [RAN2, RAN1, RAN3], including but not limited to: mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; evaluate the benefit of resource allocation/route management coordination across multiple nodes, for end-to-end route selection and optimization; and/or other. Some embodiments may be related to dynamic resource allocation between the backhaul and access links [RAN1, RAN2], including but not limited to: mechanisms to efficiently multiplex access and backhaul links (for both DL and UL directions) in time, frequency, or space under a per-link half-duplex constraint across one or multiple backhaul link hops for both TDD and FDD operation; cross-link interference (CLI) measurement, coordination and mitigation between TRPs and UEs 102; and/or other. Some embodiments may be related to high spectral efficiency while also supporting reliable transmission [RAN1], including but not limited to identification of physical layer solutions or enhancements to support wireless backhaul links with high spectral efficiency.

Some embodiments may be related to methods for routing using the IAB nodes. Some embodiments may be related to adaptation header format(s) and/or routing options.

Different architectures for IAB are possible. In a non-limiting example, functionality may be split between the gNB-CU 106 and the gNB-DU 109 above RLC (which may be referred to, without limitation, as "option 1" in some cases). In another non-limiting example, functionality may be split between the gNB-CU 106 and the gNB-DU 109 above MAC (which may be referred to, without limitation, as "option 2" in some cases). Embodiments are not limited to the above examples. The functionality may be split between the gNB-CU 106 and the gNB-DU 109 at a layer of a protocol stack different than in those examples, above a layer different than described in those examples, below a layer different than described in those examples and/or other, in some embodiments. In some embodiments, one or more of the techniques, operations, methods and/or concepts described herein may be based on a split between functionality of a PDCP layer at the gNB-CU 106 and functionality of an RLC layer at the gNB-DU 109, but embodiments are not limited to this split of functionality. In some embodiments, one or more of those techniques, operations, methods and/or concepts may be modified to include a different split of functionality (such as a split between functionality of the RLC layer at the gNB-CU 106 and functionality of the MAC layer at the gNB-DU 109 or other split). In a non-limiting example, the gNB-CU 106 may generate the PDCP header, the adaptation layer header, and the RLC header, and the gNB-DU 109 may generate the MAC header and the PHY header. This example may be based on a split between functionality of the RLC layer at the gNB-CU 106 and functionality of the MAC layer at the gNB-DU 109. Split functionality between other layers is also possible, in some embodiments.

In some embodiments, NR may support CU/DU split wherein PDCP is located in the gNB-CU 106 and RLC/MAC/PHY is located in the gNB-DU 109. In some embodiments, an adaptation layer may be used on the top of RLC, although the scope of embodiments is not limited in this respect.

FIG. 1C shows an example of a tree structure of an IAB network. Layer 2 relay may be used, although the scope of embodiments is not limited in this respect. Embodiments are not limited to the number, name, type, arrangement, connectivity and/or other aspects of the elements shown in FIG. 1C. It should be noted that the IAB relay may be a gNB-DU 109, a transmit-receive point (TRP), a device/component configured to operate as a relay, another device and/or another component, in some embodiments.

In some of the descriptions herein, it is assumed that the adaptation layer is located above the RLC, although the scope of embodiments is not limited in this respect. One function of the adaptation layer may be to provide routing information so that the PDCP packet of each UE 102 can be routed correctly via one or multiple IAB relay(s) in both uplink and downlink direction. In some embodiments, each of the links between the IAB relays in the entire path may maintain the same QoS as the data radio bearer (DRB) of the UE 102.

In some embodiments, an adaptation layer header may be used. An adaptation and/or adaptation layer header may be used to deliver the packet from the gNB-CU 106 to the end UE 102 via one or multiple IAB relay(s) 114. The header information may include various information to achieve this goal. Different options are possible. It should be noted that options and/or sub-options may be referred to in descriptions as "option 1," "option 1a," "option 1b," "option 2," and/or other for clarity, but such references are not limiting.

In option 1, a header may include each IAB node's route information. Different sub-options of option 1 are possible. In option 1a, each IAB relay 114 may remove a portion of the header before forwarding the packet. An example 800 is shown in FIG. 8. The packet 810 from the donor DU (109) to relay #1 (114) includes an adaptation header 815 that indicates relay #1 (114), relay #3 (114), and UE #1 (102). Relay #1 (114) may form the packet 820 with adaptation header 825, and may forward the packet 820 to relay #3 (114). Relay #1 (114) may remove the portion of adaptation header 815 that indicates relay #1 (114) to form the adaptation header 825, which indicates relay #3 (114) and UE #1 (102). Relay #3 (114) may form the packet 830 and may forward and/or transmit the packet 830 to UE #1 (102). In some embodiments, relay #3 (114) may remove the portion of the adaptation header 825 that indicates relay #3 (114) and the portion of the adaptation header 835 that indicates UE #1 (102). In some embodiments, relay #3 (114) may remove the adaptation header 825 from packet 820 to form packet 830. In some embodiments, the packet 830 may not include an adaptation header. For instance, the packet sent from a relay and/or gNB-DU 109 to the UE 102 (which may be a final branch of a path from the gNB-CU 106 to the UE 102) may not have an adaptation header, in some embodiments.

In option 1b, an element (gNB-DU 109, donor DU, relay 114 and/or other) may check the adaptation header to determine a next hop and/or next element, and may forward the entire packet (including the entire adaptation header) to the next element. A non-limiting example 850 is shown in FIG. 8. The adaptation header 865 of the packet 860 indicates a path, which is from the donor DU (109) to relay #1 (114) to relay #3 (114) to UE #1 (102) in this example. In some embodiments, the final relay 114 may remove the adaptation header and forward the packet (without the adaptation header) to the end UE 102. In some embodiments, only the final relay 114 removes the adaptation header and forwards the packet (without the adaptation header) to the end UE 102, and the other relays 114 do not remove or modify the adaptation header.

In some embodiments, an "IAB node" may be a relay 114. In some embodiments, an "IAB node" may be a relay 114 or to a gNB-DU 109.

In option 1b, a routing table may not be needed at each IAB node. Accordingly, routing table updates may not be needed, in some cases. In some cases of multiplexing UEs 102, an additional indication in the adaptation header may be needed to indicate where each UE 102 packet started. Option 1b may be a centralized approach in which the gNB-CU 106 has determined some or all of the path for routing/sending packets to the UE 102.

In option 2, each IAB node keeps a routing table. In this option, the gNB-CU 106 may update the routing table(s) in some cases, including but not limited to one or more of the following cases: when an IAB node is added/removed; when the UE 102 attaches to an IAB node; when a handover of the UE 102 from one IAB node to another IAB node occurs; when the UE 102 is removed from an IAB node; when a link of one of the IAB node is not available; and/or other. In some embodiments, in option 2, the adaptation header may include a UE ID and UE bearer ID. In some embodiments, the adaptation header may include a source ID and/or source bearer ID.

In some embodiments, in option 2, a centralized approach may be used, wherein the gNB-CU 106 may determine routes, parameters and/or other information. In some embodiments, in option 2, a centralized approach may be used, wherein one or more of the IAB nodes may determine routes, parameters and/or other information. In some embodiments, a centralized approach or a distributed approach may be used.

A non-limiting example of a routing table at relay #1 (114) is given in the table below.

| Incoming | | | Outgoing | |
|---|---|---|---|---|
| Source | Destination | UE bearer ID | IAB ID | IAB bearer ID |
| Donor DU | UE 1 | 1 | Relay 3 | 1 |
| Relay 3 | UE 1 | 1 | Donor DU | 1 |
| Donor DU | UE 2 | 1 | Relay 4 | 1 |
| Relay 4 | UE 2 | 1 | Donor DU | 1 |
| Donor DU | UE 3 | 1 | Relay 4 | 1 |
| Relay 4 | UE 3 | 1 | Donor DU | 1 |

In some embodiments, a routing table update may be performed. In some embodiments related to option 2 described herein, each IAB node may use a routing table. In some embodiments related to option 2 described herein, one or more of the IAB nodes may use a routing table.

In some embodiments, the gNB-CU 106 may update the routing tables at some or all IAB nodes for one or more topology changes, including but not limited to: an IAB node attaches to a donor DU/IAB node; an IAB node releases from a donor DU/IAB node; the UE 102 attaches to a donor DU/IAB node; the UE 102 releases from a donor DU/IAB node; a UE handover from one IAB node to another IAB node; and/or other.

In some embodiments, in a centralized approach, the gNB-CU 106 may update the routing table of each IAB node via F1 interface or may send RRC message(s) to each IAB node. In some cases, in which RRC message(s) are used, the UE side of the IAB node may need to implement to support routing update function.

In some embodiments, in a distributed approach, F1-AP message(s) may be used to carry the routing information. In some embodiments, decisions (such as decisions related to routing and/or other) may be made hop by hop at each gNB-DU 109. This also may involve DRB selection for next hop(s) to make sure the QoS of the UE bearer is mapped correctly.

In some embodiments, in cases in which the IAB node supports EN-DC on the control plane, update of the routing table may be performed via RRC message(s) from one or more components of an LTE network to the IAB node. The gNB-CU 106 may signal to LTE via Xn interface of the corresponding routing table update. Then one or more components of an LTE network may forward/translate and send to each IAB node.

In some embodiments, at one or more of the IAB node attached to the network, a default bearer may be created for SRB for some or all UEs 102. The above routing table may assume that multiple UE bearers of the same QoS will map to one bearer between two IAB nodes. In some cases, this may be performed to reduce the number of bearers needed at each IAB node. Accordingly, bearer(s) per UE 102 may not necessarily be created at each IAB node.

FIG. 9 shows an example 900 of an IAB relay node bearer mapping. It can be up to the network to create some or all of the DRB bearers for different QoS between IAB nodes or create them as the UE 102 is added to the IAB network.

In some embodiments, an adaptation header may include route information of one or more IAB nodes. In some embodiments, an adaptation header may include route information of each IAB node. In some embodiments, an IAB node may remove a portion of a header of a packet and may forward the packet. In some embodiments, an IAB node may determine the next hop/element and may forward the entire packet. In some embodiments, in cases of multiplexing UEs 102, an additional indication in the adaptation header may be used and/or needed to indicate where each UE packet started. In some embodiments, each IAB node may keep a routing table with source ID, destination ID, bearer ID, next hop ID, next hop bearer ID and/or other. In some embodiments, a routing table may be updated when: an IAB node attaches to a donor DU/IAB node; an IAB node releases from a donor DU/IAB node; when the UE 102 attaches to a donor DU/IAB node; when the UE 102 releases from a donor DU/IAB node; when a UE handover from one IAB node to another IAB node occurs; and/or other. In some embodiments, a routing table update via one or more of: F1-AP; F1; RRC from gNB-CU 106; RRC from one or more components of an LTE network; and/or other. In some embodiments, a bearer mapping from IAB node to UE bearer may be used.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Next Generation Node-B (gNB), the gNB configured with logical nodes including a gNB central unit (gNB-CU) and a gNB distributed unit (gNB-DU), the apparatus comprising: memory; and processing circuitry, configured to:
at the gNB-CU, determine a route for delivery of a data packet from the gNB-DU to a User Equipment (UE) on an integrated access backhaul (IAB) of relays, wherein the route includes one or more of the relays of the IAB;
generate a physical layer (PHY) data packet for the delivery of the data packet, the PHY data packet generated in accordance with a split between functionality of a packet data convergence protocol (PDCP) layer at the gNB-CU and functionality of a radio link control (RLC) layer at the gNB-DU, wherein to generate the PHY data packet in accordance with the split, the processing circuitry is configured to:
at the gNB-CU:
generate a PDCP header and an adaptation layer header, wherein the adaptation layer header indicates the one or more relays included in the route;
transfer the data packet, the PDCP header, and the adaptation layer header to the gNB-DU;
at the gNB-DU:
generate an RLC header, a medium access control (MAC) header, and a PHY header; and
generate the PHY data packet to include the data packet, the PDCP header, the adaptation layer header, the RLC header, the MAC header, and the PHY header; and
at the gNB-DU, forward the PHY data packet to a first relay of the one or more relays included in the route.

2. The apparatus according to claim 1, the processing circuitry further configured to:
at the gNB-CU, encode the adaptation layer header to include a sequence of relay identifiers of the one or more relays included in the route,
wherein the sequence of relay identifiers indicates an order in which the PHY data packet is to be routed by the one or more relays included in the route.

3. The apparatus according to claim 1, the processing circuitry further configured to:
at the gNB-CU, generate the adaptation layer header for an adaptation layer between the PDCP layer and the RLC layer.

4. The apparatus according to claim 1, the processing circuitry further configured to:
at the gNB-DU, forward the PHY data packet to the first relay of the one or more relays included in the route for forwarding to:
if the route includes two or more relays: a second relay included in the route, or
if the route includes less than two relays: the UE.

5. The apparatus according to claim 1, the processing circuitry further configured to:
at the gNB-CU, generate the PDCP header based on the data packet;
at the gNB-DU, generate the RLC header based on the data packet, the PDCP header, and the adaptation layer header.

6. The apparatus according to claim 1, the processing circuitry further configured to:
at the gNB-CU, as part of the functionality of the PDCP layer, perform one or more of: ciphering for the data packet, and integrity protection for the data packet; and
at the gNB-DU, as part of the functionality of the RLC layer, perform one or more of: fragmentation of the data packet, and concatenation of the data packet with one or more other data packets.

7. The apparatus according to claim 1, wherein:
the apparatus is coupled to an F1 interface, and
the processing circuitry is further configured to transfer the data packet, the PDCP header, and the adaptation layer header from the gNB-CU to the gNB-DU on the F1 interface.

8. The apparatus according to claim 1, wherein the data packet is received at the gNB-CU from a user plane function (UPF) entity on a next generation (NG) interface.

9. The apparatus according to claim 1, wherein the gNB is arranged to operate in accordance with a new radio (NR) protocol.

10. The apparatus according to claim 1, wherein:
the apparatus includes a transceiver to transmit the PHY data packet,
the processing circuitry includes a baseband processor to determine the route for the delivery of the data packet, and
the memory is configured to store information related to the one or more relays included in the route.

11. A non-transitory computer-readable storage medium that stores instructions for execution by processing circuitry of a Next Generation Node-B (gNB) of a Third Generation Partnership Project (3GPP) network, the gNB configured with logical nodes including a gNB central unit (gNB-CU) and a gNB distributed unit (gNB-DU), the operations to configure the processing circuitry to:
at the gNB-CU, determine routing tables for an integrated access backhaul (IAB) of relays for delivery of data packets from the gNB to one or more User Equipments (UEs) attached to the IAB, wherein a routing table is determined for each of the relays of the IAB,
wherein each of the routing tables indicates pairs of sources and destinations to be used for routing of data packets,
wherein each of the sources is one of the relays of the IAB or the gNB-DU, wherein each of the destinations is one of the relays of the IAB or one of the UEs;
at the gNB-CU, transfer the routing tables to the gNB-DU for forwarding to the relays of the IAB;
at the gNB-CU, determine updated routing tables in response to a topology change of one of the relays of the IAB; and
transfer the updated routing tables to the gNB-DU for forwarding to the relays of the IAB.

12. The non-transitory computer-readable storage medium according to claim 11, wherein:
the topology change is related to one or more of:
an attachment of another relay to one of the relays of the IAB,
an attachment of another relay to the gNB-DU,
a release of one of the relays of the IAB from another relay of the IAB, and
a release of one of the relays of the IAB from the gNB-DU.

13. The non-transitory computer-readable storage medium according to claim 11, wherein:
the topology change is related to one or more of:
an attachment of another UE to one of the relays of the IAB,
an attachment of another UE to the gNB-DU,
a release of one of the UEs attached to the IAB from one of the relays of the IAB,
a release of one of the UEs attached to the IAB from the gNB-DU, and
a handover of one of the UEs attached to the IAB from a first relay of the IAB to a second relay of the IAB.

14. The non-transitory computer-readable storage medium according to claim 11, the operations to further configure the processing circuitry to:
at the gNB-CU, transfer the updated routing tables to the gNB-DU over an F1 interface for forwarding to the relays of the IAB.

15. The non-transitory computer-readable storage medium according to claim 11, the operations to further configure the processing circuitry to:
at the gNB-CU, for each of the relays of the IAB: encode, for transmission by the gNB-DU or by another relay of the IAB, a radio resource control (RRC) message that indicates a corresponding updated routing table.

16. The non-transitory computer-readable storage medium according to claim 11, wherein:
the gNB is arranged to communicate with a Third Generation Partnership Project Long Term Evolution (3GPP LTE) network and with a New Radio (NR) network in accordance with an Evolved Universal Terrestrial Radio Access New Radio Dual Connectivity (EN-DC) arrangement,
the operations further configure the processing circuitry to, at the gNB-CU, on an Xn interface, forward the updated routing tables to a component of the 3GPP LTE network for forwarding to the relays of the IAB.

17. The non-transitory computer-readable storage medium according to claim 11, the operations to further configure the processing circuitry to:
generate a physical layer (PHY) data packet based on a data packet intended for one of the UEs attached to the IAB, the PHY data packet generated in accordance with a split between functionality of a packet data convergence protocol (PDCP) layer at the gNB-CU and functionality of a radio link control (RLC) layer at the gNB-DU, wherein to generate the PHY data packet in accordance with the split, the operations further configure the processing circuitry to:
at the gNB-CU, generate a PDCP header;
at the gNB-DU, generate an RLC header, a medium access control (MAC) header, and a PHY header; and
at the gNB-DU, generate the PHY data packet to include the data packet, the PDCP header, the RLC header, the MAC header, and the PHY header.

18. A relay of an integrated access backhaul (IAB) of relays, comprising: memory; and processing circuitry, configured to:
decode an adaptation layer header of a packet received from another relay of the IAB or from a Next Generation Node-B distributed unit (gNB-DU) of a Next Generation Node-B (gNB), wherein the adaptation layer header indicates a route for the packet between the gNB and a User Equipment (UE), wherein the route includes the relay and is configurable to include one or more other relays;
determine, based on the adaptation layer header, a destination for forwarding of the packet, wherein the destination is another relay of the IAB or the UE;
in a first configuration, if the destination is another relay of the IAB:
remove an identifier of the relay from the adaptation layer header to generate an updated adaptation layer header; and
forward the packet with the updated adaptation layer header to the destination; and
in a second configuration, if the destination is another relay of the IAB:
forward the packet with the adaptation layer header to the destination.

19. The relay according to claim 18, the processing circuitry further configured to:
in the first and second configurations, if the destination is the UE: forward the packet without the adaptation layer header to the destination.

20. An apparatus of a Next Generation Node-B (gNB), the apparatus comprising: memory; and processing circuitry, configured to:

determine a route for delivery of a data packet from the gNB to a User Equipment (UE) on an integrated access backhaul (IAB) of relays, wherein the route includes one or more of the relays of the IAB;

generate a packet data convergence protocol (PDCP) header, an adaptation layer header, a radio link control (RLC) header, a medium access control (MAC) header, and a physical layer (PHY) header, wherein the adaptation layer header includes a sequence of relay identifiers of the one or more relays included in the route, wherein the sequence of relay identifiers indicates an order in which the PHY data packet is to be routed by the one or more relays included in the route, encode, for forwarding to a first relay of the one or more relays included in the route, a PHY data packet that includes the PDCP header, the adaptation layer header, the RLC header, the MAC header, and the PHY header.

21. The apparatus according to claim 20, wherein:

the gNB is configured with logical nodes including a gNB central unit (gNB-CU) and a gNB distributed unit (gNB-DU), the processing circuitry is further configured to generate the PHY data packet in accordance with a functional split between the gNB-CU and the gNB-DU, wherein:

at least one of the PDCP header, the adaptation layer header, the RLC header, the MAC header, and the PHY header is generated at the gNB-CU, and at least one of the PDCP header, the adaptation layer header, the RLC header, the MAC header, and the PHY header is generated at the gNB-DU.

\* \* \* \* \*